United States Patent [19]

Richmond et al.

[11] Patent Number: 5,327,493
[45] Date of Patent: Jul. 5, 1994

[54] DEVICE FOR DETECTING TONES ON TELEPHONE LINES

[75] Inventors: Robert L. Richmond, Seattle, Wash.; Martin Richmond, Lexington, Mass.; Richard Aydelotte, Kirkland; Bennet Blake, Lynnwood, both of Wash.

[73] Assignee: Active Voice, Inc., Seattle, Wash.

[21] Appl. No.: 694,697

[22] Filed: May 2, 1991

[51] Int. Cl.$^5$ .............................................. H04M 1/64
[52] U.S. Cl. .................................. 379/372; 379/413; 379/396; 379/89; 379/252
[58] Field of Search ............... 379/372, 373, 376, 381, 379/386, 214, 413, 396, 201, 215, 415, 387, 93, 96, 88, 89, 107, 252, 53, 54, 107, 373, 374, 375, 386, 351

[56] References Cited

U.S. PATENT DOCUMENTS

| | | | |
|---|---|---|---|
| 4,086,434 | 4/1978 | Bocchi | 379/107 X |
| 4,221,933 | 9/1980 | Cornell et al. | |
| 4,277,649 | 7/1981 | Sheinbein | |
| 4,289,931 | 9/1981 | Baker | 379/386 |
| 4,395,590 | 7/1983 | Pierce et al. | 379/387 X |
| 4,534,041 | 8/1985 | Munter | |
| 4,696,031 | 9/1987 | Freudberg et al. | |
| 4,737,984 | 4/1988 | Brown | |
| 4,748,664 | 5/1988 | Blomley | 379/387 X |
| 4,782,518 | 11/1988 | Mattley et al. | 379/373 X |
| 4,809,272 | 2/1989 | Torgrim et al. | |
| 4,809,321 | 2/1989 | Morganstein et al. | |
| 4,821,314 | 4/1989 | Guyader et al. | 379/376 |
| 4,852,151 | 7/1989 | Dittakavi et al. | 379/215 X |
| 4,878,236 | 10/1989 | Ray et al. | 379/396 X |
| 4,893,332 | 1/1990 | Brown | 379/107 |
| 4,935,958 | 6/1990 | Morganstein et al. | |
| 4,995,076 | 2/1991 | Joffe et al. | 379/386 X |
| 5,007,000 | 4/1991 | Baldi | 379/386 X |
| 5,063,593 | 11/1991 | Kwon | 379/372 X |

OTHER PUBLICATIONS

Maryann Chandler, Editor; "US WEST To Offer Message Waiting Indication—Visual"; US WEST ONA Newsletter Jan. 1991, pp. 2-6.

Primary Examiner—James L. Dwyer
Assistant Examiner—Daniel S. Hunter
Attorney, Agent, or Firm—Graybeal Jackson Haley & Johnson

[57] ABSTRACT

Device for detecting and identifying call progress tones on telephone lines. The application discloses a device for converting auditory call progress tones to visual indications and a novel circuit for identifying and distinguishing call progress tones based on their on-off cadence, if any, along with various alternative embodiments including: (1) a device which converts call progress tones to visual indications as for use by the deaf, (2) a device which is programmed to automatically go off-hook at certain times, detect a tone such as a stuttered dial tone indicating a message waiting, and activate a visual indicator, and (3) the use of a capacitor or rechargeable battery which is periodically refreshed by the device automatically going off-hook and which, while the device is on-hook, provides power required by the device.

8 Claims, 5 Drawing Sheets

DEVICE FOR DETECTING TONES ON TELEPHONE LINES

BACKGROUND OF THE INVENTION

The present invention relates to the detection of call progress signaling tones on telephone lines, primarily in user telephone equipment but also in other telephone equipment such as central office or PBX equipment.

Telephone systems use recognizable call progress tones to indicate to the listener the status of a component of the system. Examples include: dial tone, busy tone, reorder tone, and ringback tone. The dial tone is a steady tone and the other three employ an on-off cadence. These tones are made to sound sufficiently different to the listener that the listener can distinguish one from another.

From time to time, the invention of additional features for telephone systems has required the adoption of a novel tone to indicate another status. For example, U.S. Pat. No. 4,221,933 issued to R. Cornell on Sep. 9, 1980 discloses the use of a "distinctive dial tone", such as "an interrupted or stuttered dial tone" to indicate to a customer that a voice message is waiting which can be accessed by dialing a special number. Similarly, U.S. Pat. No. 4,918,719 issued to Daudelin in April 1990, discloses the use of a "stuttered dial tone" as a signal meaning the user wants to dial a third number for a conference call.

The signaling tones described above are all intended for communicating with a human user of the telephone system. As originally conceived, they all require that the user be capable of hearing and distinguishing the various tones. However, in some telephone system equipment it is desired that call progress tones be detected by a device connected to the telephone line which device then causes other actions. For example, various items of telephone system equipment, such as central office switches and PBX switches, can handle additional sophisticated functions for customers if they can recognize and distinguish the various tones. Various methods of distinguishing distinctive tones are known in the art. For example, U.S. Pat. No. 4,935,958 issued to S. Morganstein on Jun. 19, 1990, discloses a device which examines the frequency and cadence of the tone, can learn the characteristics of a tone, and can identify a tone as the same as a previously learned tone. Various actions can then be electronically initiated when a distinctive tone is recognized. However, the currently known methods of identifying and distinguishing the various tones generally require equipment which is prohibitively expensive for wide distribution among individual customers.

In particular, electrical devices for identifying an on-off cadence in the call progress tone, such as for a busy tone, a ringback tone, a reorder tone, or a stuttered dial tone, are complicated and expensive. The most common method is to use precision components to look at a single cycle of the on-off cadence and accurately measure the duration of the on period and the duration of the off period. These periods are then compared to expected values, typically by using a microprocessor, to identify the tone. Similar methods are used in electrical applications other than telephone systems.

To meet the widely perceived need for a visual indication that a message is waiting for a customer, in lieu of or in addition to the stuttered dial tone, one company has developed a feature called "Message Waiting Indication—Visual". When a message is waiting for a telephone system customer, this feature illuminates an indicator light on the customer's telephone equipment. This system requires special equipment at the central office which can send a special electronic signal to the customer's telephone equipment and special customer equipment which can receive and interpret the signal and turn on the indicator light. This design has substantial limitations including: (1) cost, (2) incompatibility with the audible message waiting indication so one cannot determine whether a message is waiting by lifting the hand set of an extension telephone, (3) incompatibility with certain other telephone system features, and (4) loss of the visual message waiting indication signal if the customer's telephone is "off-hook" for 2 -½ hours or more when the signal is sent.

Special customer premises telephone equipment, such as the message waiting indication device described above, typically requires electrical power to perform the additional features. If the power requirements are low and are needed only when the telephone is "off-hook" the power can be obtained from the loop current supplied by the central office. However, various features, such as the indicator light described above, require power when the telephone is "on-hook". In these situations, power is obtained from batteries which must be periodically replaced or from a plug connected to a standard AC wall outlet.

SUMMARY OF THE INVENTION

One aspect of the disclosed invention is the conversion of auditory telephone tones to visual indications. An embodiment of this invention illuminates a visual indication light on a device connected to the customer's telephone line when there is an auditory message waiting indication in the form of a non-standard dial tone placed on the customer's line by the central office. This embodiment of the invention overcomes the short comings of the current message waiting indication—visual systems described above. It is far less expensive—the message waiting indication detector and indicator light can be added to the customer's telephone equipment without replacing existing equipment and no additional equipment is required at the central office. The auditory message waiting indication can still be heard at all extension telephones. The addition of this device at the customer premises does not interfere with any other features offered by the central office. The customer's telephone can be "off-hook" for any number of hours and the message waiting indication signal will not be lost.

Also, when a distinctive non-standard dial tone is used to indicate to a telephone system customer that the customer can retrieve a message by dialing a special number, as described above, the customer must periodically lift the hand set of the telephone and listen for the distinctive tone. This invention eliminates the need for the customer to lift the hand set and to remember to check for messages.

Another embodiment of this aspect of the invention is the enhancement of telephone communication systems for the deaf and certain similar uses. Facsimile transmission and character transmission by modem are effective means for the deaf to use telephone systems for communications. However, the inability to hear dial tones, ringback tones, and busy tones make the telephone network difficult for deaf people to use. According to the present invention, these tones, and others, are converted to visual indications to facilitate use of the system by deaf people and by people working in noisy environments.

In other applications, a user can place telephone calls without an auditory interruption, such as when they are engaged in verbal communications with another party in person or by telephone. The visual indication might take the form of an indicator light, certain characters or symbols on a display, or mechanical flags which change position.

Another aspect of the invention is a novel method of detecting a non-standard dial tone. An embodiment of this aspect of the invention automatically goes "off-hook" and determines whether a distinctive predetermined tone is present on the line. Central offices or PBX systems can use a distinctive, non-standard dial tone to indicate to a telephone user a special status, such as a message waiting. Existing systems such as described above, will send a special signal, not intended to be distinguished by the human ear, to a special user telephone which can receive the signal and illuminate an indicator light on the telephone. According to this aspect of the present invention, no special signal is required from the central office or PBX. Instead, the invented device automatically and periodically goes "off-hook", listens for a dial tone and determines whether it is the special dial tone. When a message is ready to be picked up by the customer, the turning on of the indicator light might be delayed by no more than the period of time between each automatic going off-hook and checking for the special tone.

An alternative embodiment of this aspect of the invention also allows the message waiting indicator device to automatically go off-hook soon after each use of the line to see if a message was left while the line was busy. A further embodiment also goes off-hook to check the dial tone within a short period of time after each ring with no answer in case the calling party chose to leave a message.

Another embodiment of an aspect of the invention can be used in alarm systems. Many premises alarm systems are connected to a standard telephone line and configured to automatically dial a certain telephone number when certain alarm triggering events occur. Of course, this feature is defeated, without an alarm or notice to the user of the premises, if the telephone line leading from the premises is cut or otherwise interrupted. The prior art solution to this problem uses a dedicated telephone line and includes a detector in the premises equipment which detects when the line is cut and signals accordingly. If the present invention is added to the premises equipment, the premises equipment can periodically, automatically go "off-hook" and check for a dial tone. If the dial tone is not present, it can then sound an alarm or notify the user of the premises that the line is not operational. This embodiment of the invention will allow the use of a regular telephone line which is much less expensive than a dedicated telephone line. And the regular line can also be used for standard telephone service since the system does not need to be checking for integrity of the line when the line is in use.

The invention can be configured to take any of many actions when a distinctive, predetermined tone is detected on the line. It can trigger a device which plays an auditory message for anyone who is listening; it can turn on a continuous bell or buzzer; it can move the position of a flag; it can turn on an indicator light; it can present characters or symbols on a display.

Still another aspect of the invention is a novel design of an electronic circuit which can be configured to detect interruptions in a signal, such as the stuttered dial tone, the busy tone, the ringback tone, the reorder tone, and other tones not used in the telephone system. An alternative embodiment can detect many such tones and distinguish between them and can identify a lack of interruptions as a standard dial tone. This aspect can be employed whenever interruptions of a predetermined minimum duration are to be detected, whether or not the duration of the on period or the off period is regular. This aspect of the invention can also be embodied in devices which detect interruptions in a flow of energy other than electricity, such as pneumatics, hydraulics, or optics.

In the electrical embodiment, the novel circuit employs a limiter, such as an amplifier or diode, and an RC circuit in combination with a Schmitt trigger. The resistor-capacitor circuit effectively averages the signal output so that, when the signal is present, the capacitor is, on the average, discharging or kept empty (or, in an alternative embodiment, charging or kept full) and when no signal is present, the capacitor is in the opposite state.

This circuit can be tuned to detect interruptions that are as short as one or two cycles of the lowest AC frequency that is to be considered a steady "on" in the cadence. The Schmitt trigger is configured to flop when the capacitor's charge passes a threshold, and a counter counts the flops.

To detect on-off interruption cadences of particular frequencies, the counter is configured to count flops during a particular period of time. The on-off cadence of the tone effects a corresponding high-low voltage cadence in the capacitor, which, in turn, produces a series of high-low pulses in the Schmitt trigger that are counted by a counter. A logic circuit or microprocessor determines whether a particular tone is detected by comparing the count to a predetermined number. In the alternative embodiment which can distinguish between the various call progress tones, the number of pulses is compared to a set of values to determine which tone is present.

This aspect of the invention presents numerous advantages over the prior art. First, by distinguishing the tones according to the number of off interruptions during a period of time rather than measuring the on duration and the off duration of a single cycle, this simple circuit eliminates the complicated, expensive hardware and software required by previous systems. Also, the novel circuit is broadly tolerant of variations in the on duration and the off duration, allowing it to correctly identify the call progress tones even if their cadences are irregular or differ from the norm.

Within the United States, telephone network regulations limit the amount of power that can be drawn from the network by customer premises equipment in an on-hook state to about 230 microwatts. This is not enough power to illuminate an indicator light or run logic circuits. When the equipment is off-hook, between 96 milliwatts and 1.53 watts of power is available from the network, which is more than enough to power devices such as the present invention. A further aspect of the present invention automatically goes off-hook periodically to gain power which stores in an energy storage device. The stored energy is then used to run the equipment while it is in the on-hook state. This eliminates the need to power the device from standard AC current or batteries which require replacement. The energy storage device can be either a large capacitor or a rechargeable battery.

BRIEF DESCRIPTION OF THE DRAWINGS

The following drawings show the currently preferred embodiment of the invention: a customer premises device which automatically goes off hook periodically, checks for a stuttered dial tone, and if one is found, illuminates a visual indicator light.

DETAILED DESCRIPTION

Figures 1, 2:
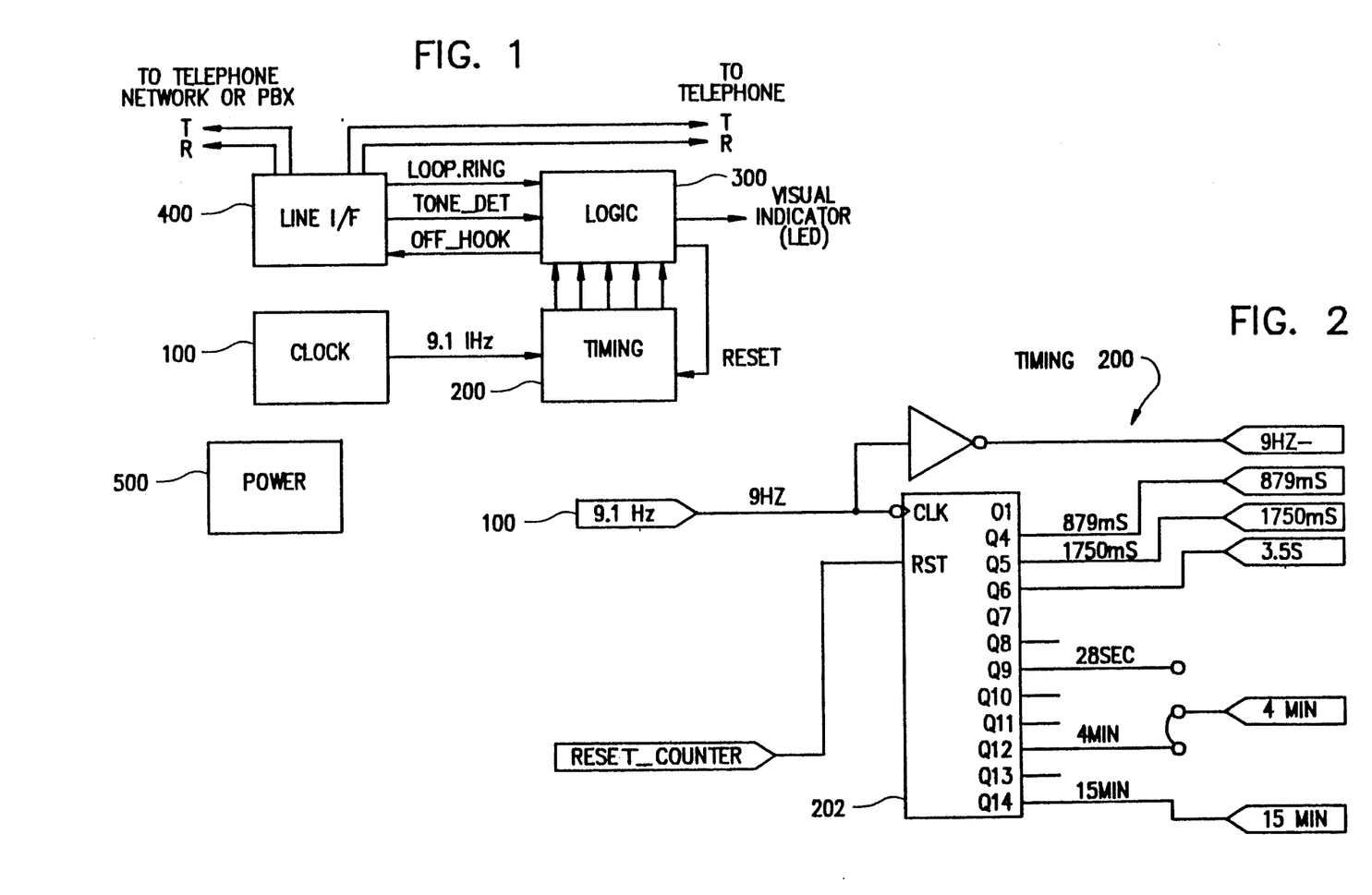
FIG. 1 is a block diagram showing the components of the preferred embodiment and the relationships between them.
FIG. 2 shows the timing counter which takes the 9 Hertz clock signal and creates from it timing pulses of various durations.

FIG. 1 is a block diagram showing the five basic functional blocks of the stutter dial tone indicator: system clock 100, timing generator 200, logic block 300, telephone line interface 400, and power supply 500. The system clock 100 should be of relatively low frequency, on the order of 10 Hz, to limit power requirements, and should be fairly insensitive to power supply fluctuation. This allows use of either batteries or a power storage capacitor as the power supply 500 to keep the bulk and cost of the unit to a minimum.

FIG. 2 shows timing generator 200 consisting of binary counter 202, which takes the clock signal and divides it by powers of two to derive the basic timing functions used by the logic. A window timer (approximately 1.75 seconds) is used to determine how long to go off-hook to look for stutter dial tone. A reset timer (approximately 3.55 seconds) is used to reset timing generator 200 and to generate a signal that the unit has checked once for stutter dial tone. A short timer (approximately 3.75 minutes) is used for checking for stutter dial tone after each ring-no-answer call or off-hook by the telephone. A long timer (approximately 15 minutes) is used for periodic checking to see if the state of stutter dial tone has changed without any activity at the telephone, such as by the user receiving messages from another phone. The timers used are examples only and each could be changed and at least one timer could be eliminated or added without affecting the overall operation of the unit. The window timer need only be long enough to allow a predetermined number of pulses to be detected. As discussed below, the timing generator 200 is reset by logic block 300 on any customer off-hook or ringing.

Figure 3:
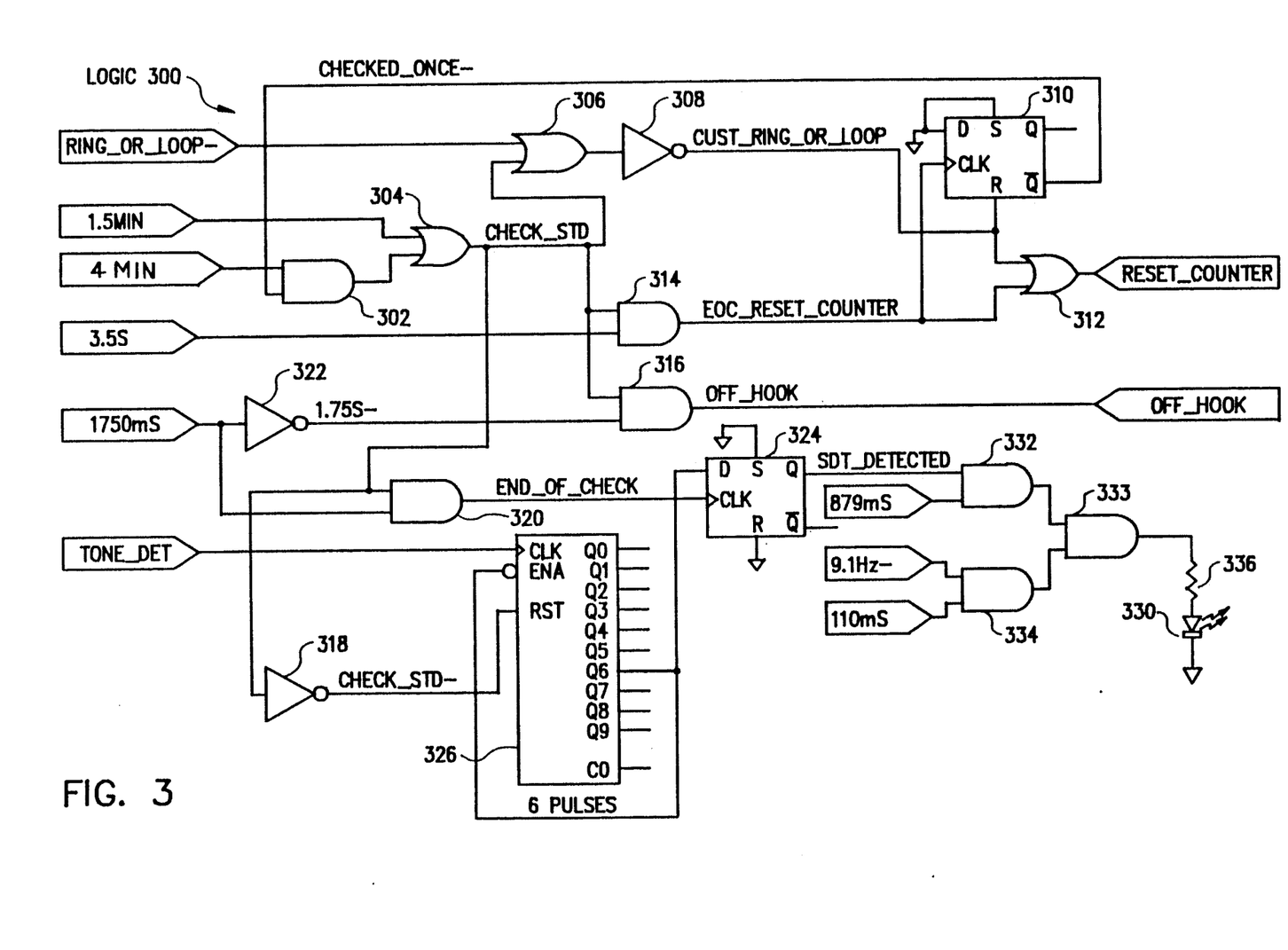
FIG. 3 shows the central logic to which the outputs of all the other circuits connect.

FIG. 3 shows how the logic block 300 uses the timers produced by binary counter 202 to generate an off-hook signal to the telephone line interface 400 and counts the number of tone pulses received during the off-hook window. If the number of pulses is of a predetermined number corresponding to the stutter tone cadence, then the logic block causes a light to be illuminated, thereby informing the user that a message is waiting.

The logic block uses an AND gate 302 and an OR gate 304 to determine whether to initiate the logic using the short or the long timer. The first check for stutter tone uses the short timer. Upon receiving a signal from the long timer or from the short timer through AND gate 302, OR gate 304 signals AND gate 316 to go high, which signals the hookswitch 404 in the telephone interface 400 to go off-hook. OR gate 304 also sends a signal through inverter 318 to reset the counter 326, thereby allowing it to count the number of pulses detected by the tone detector 406 in the telephone line interface 400. When a predetermined number of pulses are detected, counter 326 disables itself and signals latch 324 that a stutter tone has been detected. When the time set by the window timer elapses, a signal is sent through AND gate 320 to latch 324 which turns on an indicator light that tells the user that a stutter tone has been detected, so a message is waiting.

The indicator light circuit consists of a light emitting diode 330 connected with timing signals from the timing circuit through AND gates 332, 333, 334 to produce a composite signal which flashes the light emitting diode 330. The resulting signal generates four 55 millisecond flashes every 1.75 seconds. The duty cycle of the composite signal is 12.5%, reducing the average current requirements to 12.5% of the on current. Placing the light emitting diode 330 in series with a 4.7K ohm resistor 336 results in an average current requirement for the light emitting diode of approximately 114 microamperes when flashing.

When the time set by the reset timer elapses, a signal is sent through AND gate 314 to OR gate 312 which resets the timing generator 200. The same signal from AND gate 314 is sent to latch 310, which signals that the unit has checked once for a stutter tone and clears gates 302, 304, and 314. This forces all subsequent checks for stutter tone to be initiated by the long timer.

The system can be easily adapted to identify any tone with a predetermined, distinctive cadence, such as ringback tone, busy signal, facsimile set-up tone and the cessation of voice communication. The window timer must be set to be long enough to allow the counter 326 to count a number of pulses that is distinctive for each tone. Latch 324 becomes a plurality of latches; one for each tone to be identified. Counter 326 signals whichever latch corresponds to the number of pulses detected, and the latch signals the output device to inform the user of the tone detected. Tone detection circuit 406 need only be modified by choosing resistors and capacitors so as to accommodate the frequency of each tone to be identified.

Ringing or loop current in the user telephone, upon being detected by the telephone line interface 400, resets latch 310 via OR gate 306 and inverter 308, allowing the system to be initiated again by the short timer. Ringing or loop current will also reset timing generator 200 via OR gate 306, inverter 308, and OR gate 312, preparing the unit for further detection of stutter dial tone. For the duration of ringing or loop current this resetting of timing generator 200 will prevent AND gate 316 from sending a signal to go off-hook to hookswitch 404, thereby preventing tone detection until initiation by the short timer after the ringing or loop current ceases, and preventing the system from going off hook while ringing is occurring.

Figure 4:
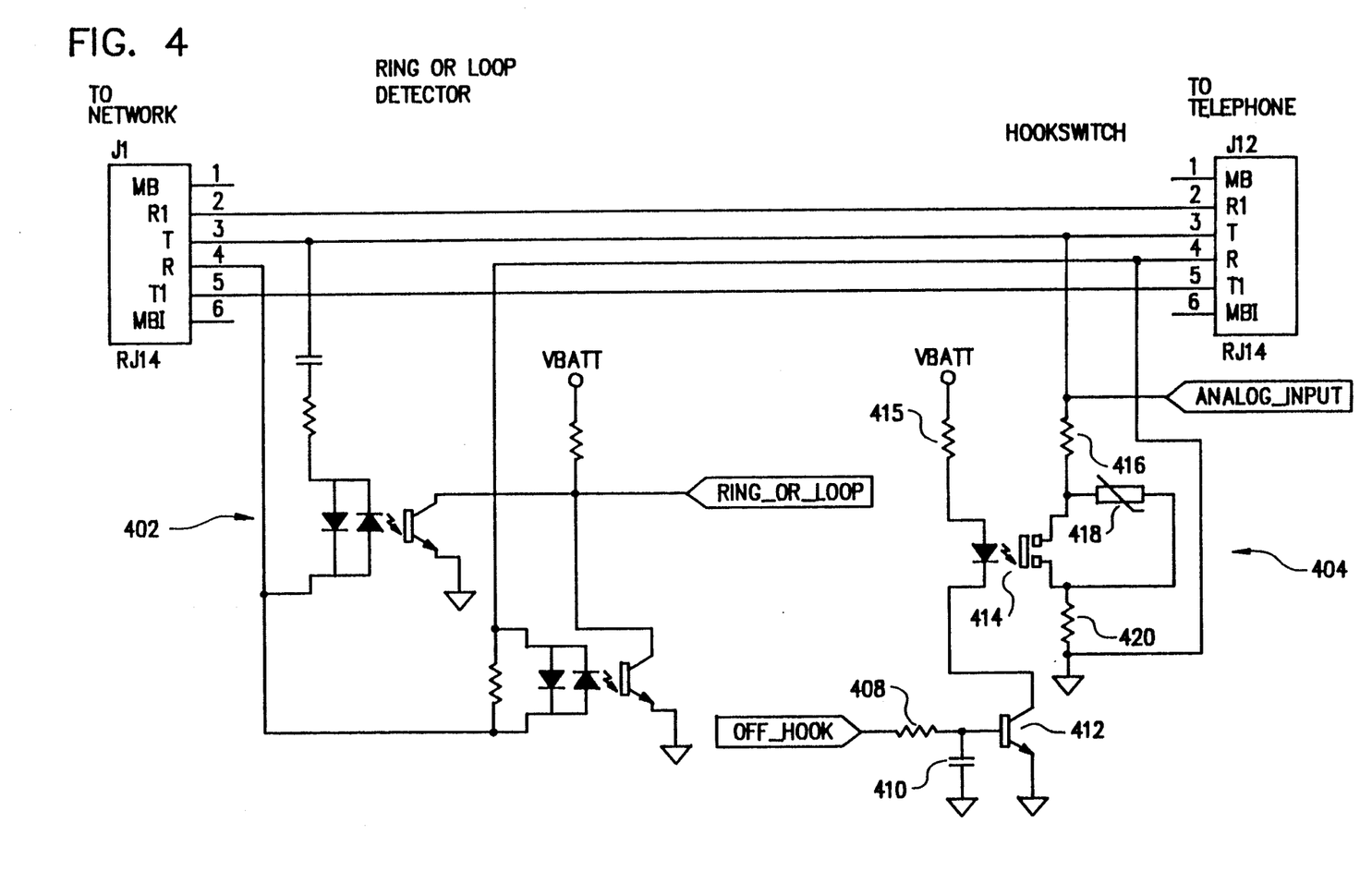
FIG. 4 shows two elements of the line interface: the ring or loop detector and the hook switch.

FIG. 4 shows the circuit configuration for implementing two of the functions of the telephone line interface 400: the ring or loop current detection circuit 402 and the hookswitch 404. Detection circuit 402 is a dual opto isolator that can detect loop current in excess of 10 mA and FCC class B ringing. In either situation, detection circuit 402 sends a signal to logic block 300, which resets the system as discussed above.

Hookswitching is done with opto hookswitch 414, controlled by transistor 412 which receives the signal to go off-hook from the logic block 300 as described above. RC circuit 408, 410 is used to slow the on/off time of the opto hookswitch to limit the dV/dt generated on the line and generate a cleaner on-hook to off-hook transition. Resistor 418 is used to prevent large voltages from destroying the hookswitch integrated circuit and resistors 416 and 420 increase the off-hook resistance to increase the amount of signal available to the analog signal amplifier 430.

Figure 5:
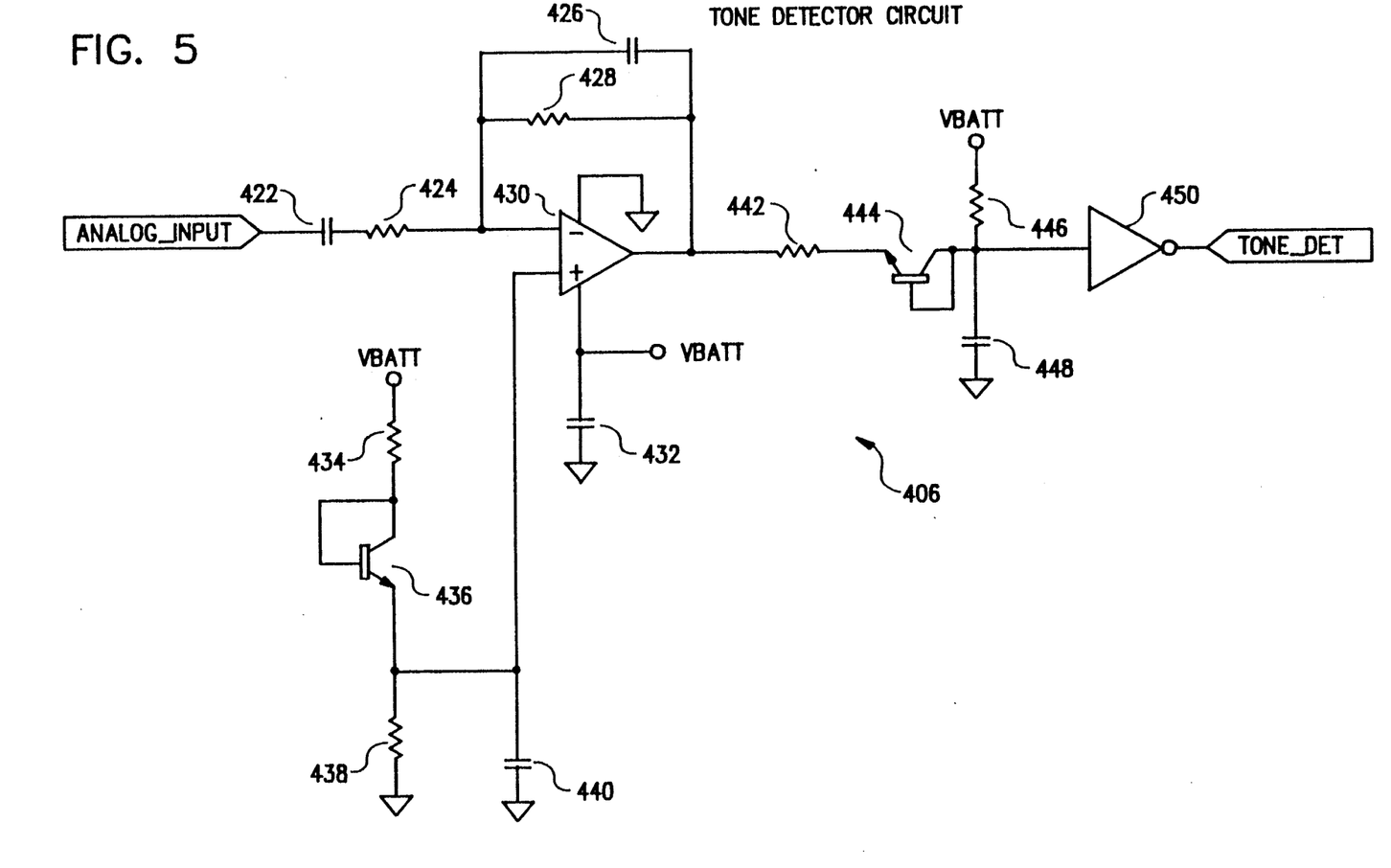
FIG. 5 shows the third element of the line interface: the tone detector circuit.

The third part of telephone line interface 400 is tone detector 406 as shown in FIG. 5. The analog input from the telephone line is AC coupled to amplifier 430 by capacitor 422. Capacitor 422 plus resistor 424 determine the $-3dB$ corner of the highpass part of amplifier 430, which is about 280 Hz. The feedback pair of resistor 428 and capacitor 426 provide about 45dB of gain and a lowpass $-3dB$ corner at about 725 Hz. If it is desired to detect other frequencies, then the resistors and capacitors can be modified accordingly. The combination of resistor 434, transistor 436, and resistor 438 bias the output of amplifier 430 at 86% of the battery voltage less one diode drop. This is to guarantee that the input to Schmitt trigger 450 will always force the output low when there is no dial tone signal present on the line. Transistor 436 is wired as a precision diode to mirror transistor 444.

When an AC signal is present, the output of amplifier 430 will be driven low. This causes transistor 444 to draw charge out of capacitor 448 through resistor 442 to lower its voltage. When enough charge has been taken out of capacitor 448 to lower its voltage to 28% of the power supply 500 voltage, Schmitt trigger 450 output will send a signal to counter 326 indicating that a tone pulse is present on the line. When the signal in the line disappears, power supply 500 will recharge capacitor 448 through resistor 446 until the voltage reaches 72% of the power supply 500 voltage, at which point the Schmitt trigger 450 output will go low to indicate that no tone is present on the line. It is imperative to adjust resistor 446 and capacitor 448 to be such that the RC time constant matches the minimum stutter pause of the tones to be identified.

Figure 6:
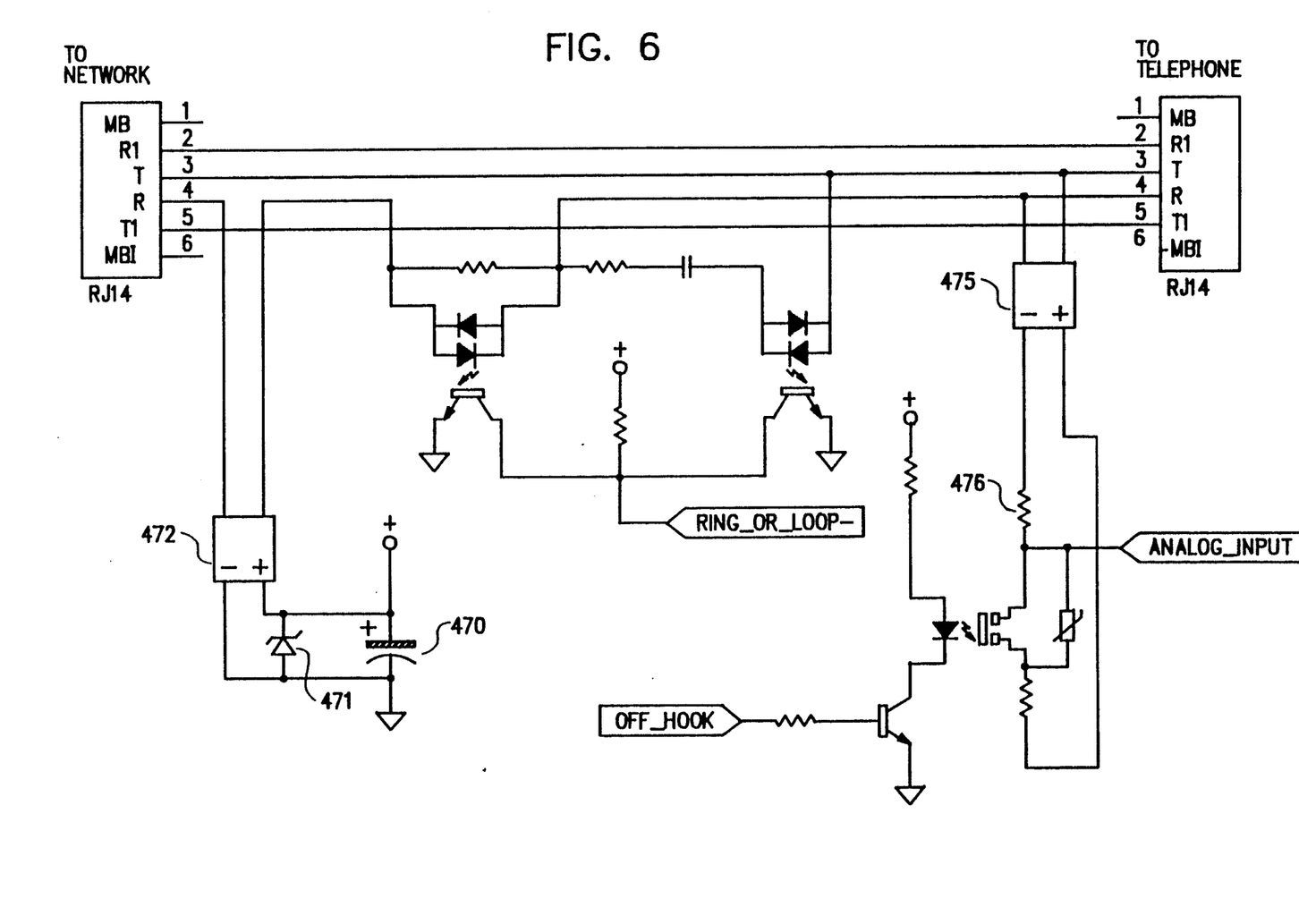
FIG. 6 shows a capacitor power supply which is an alternative to the battery power supply assumed in FIG. 4.

The preferred embodiment may be configured to be powered by replaceable batteries or with a large capacitor which is charged from loop current when either the attached telephone unit or the stuttered dial tone indicator unit is off-hook. FIG. 6 shows the same circuits as FIG. 4 with appropriate modifications for the capacitor power system.

The large capacitor 470, in parallel with a zener diode 471, is coupled to the output of a rectifier 472 which is coupled in series to one of the two telephone lines. The rectifier 472 rectifies the current to make the device polarity insensitive. The zener diode 471 limits the maximum voltage across the capacitor to 5.5 volts. The capacitor 470 has a capacitance of one farad.

Because the ground reference for the device is now tied to one of the two incoming telephone lines, a second rectifier 475 is required to assure that the tone detector circuit is coupled to the opposite side of a 150 ohm resistor 476 from the ground reference so that the tone signals can be detected.

The remaining components of FIG. 6, which are not numbered, are unchanged from FIG. 4.

While the above description discloses only particular embodiments, it will be readily apparent to persons skilled in the art that numerous changes and modifications can be made to the above described device, including the use of equivalent means, devices, and method steps, without departing from the spirit of the invention.

For example, by adding additional window timers from the timing block to the logic block, the device can be adapted to identify interrupted tones with different cadences of interruption. Also, it can be adapted to identify a tone which has sufficient power to prevent the capacitor from charging and has no interruptions as a standard dial tone. It can further be adapted to create a visual indication upon the identification of any of the above tones. The visual indication might consist of a mechanical flag, symbols on a display, or a different indicator light for each tone. The device can also be configured to convert auditory telephone call progress tones to visual indications without including a means for automatically, periodically going off hook to check the tone. Similarly, instead of creating a visual indication of the tone, the device can be adapted to automatically trigger any other action of a device when it identifies a tone. And, in addition to identifying tones by their cadence, well known filtering techniques can be used to identify call progress tones by their frequencies, in lieu of or in addition to their cadences.

We claim:

1. A device for connecting to a pair of telephone line conductors, for detecting the presence of a stuttered dial tone on the line, comprising:
   (a) line interface means for connecting the pair of conductors with an off hook impedance in response to one or more events selected from the following group:
      (i) periodically where the periods are between one second and 24 hours,
      (ii) within one hour after a use of the line, and
      (iii) within one hour after a ring;
   (b) detection means for sensing whether the stuttered dial tone is present on the line; and
   (c) indicator means, responsive to the detection means, for indicating whether the stuttered dial tone is present on the line.

2. The device of claim 1 further comprising:
   (a) a capacitor coupled to the telephone line conductors;
   (b) a charging means for charging the capacitor from the telephone line; and
   (c) means for drawing power from the capacitor for use by the device.

3. The device of claim 1 wherein the indicator means is a human perceptible indicator.

4. A method of detecting on a pair of telephone line conductors the presence of a stuttered dial tone comprising:
   (a) connecting the pair of conductors with an off hook impedance in response to one or more events selected from the following group:
      (i) periodically where the periods are between one minute and 24 hours,
      (ii) within one hour after a use of the line, and (iii) within one hour after a ring;
(b) detecting whether the stuttered dial tone is present on the line; and
(c) indicating if the stuttered dial tone is detected on the line.

5. A device for connecting to a telephone line for indicating the presence of a message waiting signal on the line comprising:
  (a) line interface means for establishing communications on the line in response to one or more events selected from the following group:
    (i) periodically where the periods are between one second and 24 hours,
    (ii) within one hour after a use of the line, and
    (iii) within one hour after a ring;
  (b) detection means for sensing whether the message waiting signal is present on the line; and
  (c) indicator means, responsive to the detection means, for indicating whether the message waiting signal is present on the line.

6. The device of claim 5 wherein the indicator means is a human perceptible indicator.

7. The device of claim 5 further comprising:
  (a) a capacitor coupled to the telephone line;
  (b) a charging means for charging the capacitor from the telephone line; and
  (c) means for drawing power from the capacitor for use by the device.

8. A method of detecting on a telephone line the presence of a message waiting signal comprising:
  (a) establishing communication on the line in response to one or more events selected from the following group:
    (i) periodically where the periods are between one minute and 24 hours,
    (ii) within one hour after a use of the line, and
    (iii) within one hour after a ring;
  (b) detecting whether the message waiting signal is present on the line; and
  (c) indicating if the message waiting signal is detected on the line.

* * * * *

REEXAMINATION CERTIFICATE (3356th)

United States Patent
[11] B1 5,327,493

Richmond et al.

[45] Certificate Issued Oct. 14, 1997

[54] DEVICE FOR DETECTING TONES ON TELEPHONE LINES

[75] Inventors: Robert L. Richmond, Seattle, Wash.; Martin Richmond, Lexington, Mass.; Richard Aydelotte, Kirkland; Bennet Blake, Lynnwood, both of Wash.

[73] Assignee: Active Voice, Inc., Seattle, Wash.

Reexamination Request:
No. 90/004,027, Nov. 8, 1995

Reexamination Certificate for:
Patent No.: 5,327,493
Issued: Jul. 5, 1994
Appl. No.: 694,697
Filed: May 2, 1991

[51] Int. Cl.$^6$ .................................................. H04M 1/64
[52] U.S. Cl. .................... 379/372; 379/413; 379/396; 379/89; 379/252
[58] Field of Search .................................. 379/372, 373, 379/376, 381, 386, 214, 413, 396, 201, 215, 415, 387, 93, 96, 88, 89, 107, 252, 53, 54, 375, 351

[56] References Cited

U.S. PATENT DOCUMENTS

| | | | |
|---|---|---|---|
| 2,901,541 | 8/1959 | Kenyon | 375/338 |
| 4,027,102 | 5/1977 | Ando et al. | 379/351 |
| 4,390,750 | 6/1983 | Bartelink | 379/42 |
| 4,529,845 | 7/1985 | Boechmann | 379/376 |
| 4,866,762 | 9/1989 | Pintar | 379/200 |
| 4,926,469 | 5/1990 | Smith et al. | 379/123 |
| 5,063,593 | 11/1991 | Kwon | 379/386 |

OTHER PUBLICATIONS

Schwartz, Mischa, "Information Transmission, Modulation, and Noise," McGraw–Hill Book Company, NY, p. 201 1970.
"Response to Functional/Technical Requirements," Ro–Mar Ltd May 1990.
"VMI–1000 Installation Instructions," Ro–Mar Ltd Jan. 1990.
"VMI–1000 Voice Message Waiting Indicator made by Ro–Mar" from Ro–Mar Corp Jan. 1990.
"Operation and Installation Instructions for Telco/VMS Supplier VMI–1000 Visual Message Waiting Indicator" from RoMar Corporation (see Affidavith which is attached for date of Publication) Jan. 1990.

*Primary Examiner*—Krista M. Zele

[57] ABSTRACT

Device for detecting and identifying call progress tones on telephone lines. The application discloses a device for converting auditory call progress tones to visual indications and a novel circuit for identifying and distinguishing call progress tones based on their on-off cadence, if any, along with various alternative embodiments including: (1) a device which converts call progress tones to visual indications as for use by the deaf, (2) a device which is programmed to automatically go off-hook at certain times, detect a tone such as a stuttered dial tone indicating a message waiting, and activate a visual indicator, and (3) the use of a capacitor or rechargeable battery which is periodically refreshed by the device automatically going off-hook and which, while the device is on-hook, provides power required by the device.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-8 is confirmed.

New claims 9-29 are added and determined to be patentable.

9. *The device of claim 1 further comprising an optical coupler coupled between one of the pair of telephone line conductors and the line interface means.*

10. *The device of claim 1 further comprising a capacitor coupled between one of the pair of telephone line conductors and the detection means.*

11. *The device of claim 1 further comprising a ring detection circuit coupled to the pair of telephone line conductors, which ring detection circuit is further coupled to the line interface means and prevents the line interface means from connecting the pair of telephone line conductors with an off hook impedance when a ring is detected.*

12. *The device of claim 1 wherein the stuttered dial tone has a repeating cadence of a first portion and a second portion and the detection means comprises:*
    *(a) an energy storage component;*
    *(b) a circuit which increases the quantity of energy in the energy storage component during the first portion and decreases the quantity of energy in the energy storage component during the second portion.*

13. *The device of claim 5 wherein the message waiting signal has a repeating cadence of a first portion and a second portion and the detection means comprises:*
    *(a) an energy storage component;*
    *(b) a circuit which increases the quantity of energy in the energy storage component during the first portion and decreases the quantity of energy in the energy storage component during the second portion.*

14. *A device for connecting to a pair of telephone line conductors for detecting the presence of a stuttered dial tone on the line, comprising:*
    *(a) a hookswitch circuit which connects the pair of telephone line conductors with an off hook impedance in response to one or more events selected from the following group:*
        *(i) periodically where the periods are between one second and 24 hours,*
        *(ii) within one hour after a use of the line, and*
        *(iii) within one hour after a ring;*
    *(b) a detection circuit which detects the presence of a stuttered dial tone on the line; and*
    *(c) an indicator circuit which is responsive to the detection circuit and indicates whether the stuttered dial tone is present on the line.*

15. *The device of claim 14 further comprising:*
    *(a) a capacitor coupled to the telephone line conductors;*
    *(b) a charging circuit which charges the capacitor from the telephone line; and*
    *(c) a power circuit which draws power from the capacitor for use by the device.*

16. *The device of claim 14 further comprising an optical coupler coupled between one of the pair of telephone line conductors and the hookswitch circuit.*

17. *The device of claim 14 further comprising a capacitor coupled between one of the pair of telephone line conductors and the detection circuit.*

18. *The device of claim 14 further comprising a ring detection circuit coupled to the pair of telephone line conductors, which ring detection circuit is further coupled to the hookswitch circuit and prevents the hookswitch circuit from connecting the pair of telephone line conductors with an off hook impedance when a ring is detected.*

19. *The device of claim 14 wherein the stuttered dial tone has a repeating cadence of a first portion and a second portion and the detection circuit comprises:*
    *(a) an energy storage component;*
    *(b) a circuit which increases the quantity of energy in the energy storage component during the first portion and decreases the quantity of energy in the energy storage component during the second portion.*

20. *The device of claim 1 wherein the detection means further comprises:*
    *(a) means for sensing on the line a voltage over time;*
    *(b) means for converting the voltage over time, if a stuttered dial tone is present, to a high-low cadence of a high voltage state and a low voltage state over time corresponding to variations in the stuttered dial tone;*
    *(c) means for, in response to each transition of a plurality of voltage transitions between the high voltage state and the low voltage state, incrementing a counter; and*
    *(d) means for, if the counter is incremented to an appropriate number during a period of time, responding that the stuttered dial tone is present.*

21. *The method of claim 4 wherein the step of detecting whether the stuttered dial tone is present includes the sub-steps of:*
    *(a) sensing on the line a voltage over time;*
    *(b) converting the voltage over time, if a stuttered dial tone is present, to a high-low cadence of a high voltage state and a low voltage state over time corresponding to variations in the stuttered dial tone;*
    *(c) in response to each transition of a plurality of voltage transitions between the high voltage state and the low voltage state, incrementing a counter; and*
    *(d) if the counter is incremented to an appropriate number during a period of time, responding that the stuttered dial tone is present.*

22. *The device of claim 5 wherein the detection means further comprises:*
    *(a) means for sensing on the line a voltage over time;*
    *(b) means for converting the voltage over time, if a message waiting signal is present, to a high-low cadence of a high voltage state and a low voltage state over time corresponding to variations in the message waiting signal;*
    *(c) means for, in response to each transition of a plurality of voltage transitions between the high voltage state and the low voltage state, incrementing a counter; and*

(d) means for, if the counter is incremented to an appropriate number during a period of time, responding that the message waiting signal is present.

23. The method of claim 8 wherein the step of detecting whether the message waiting signal is present includes the sub-steps of:

(a) sensing on the line a voltage over time;

(b) converting the voltage over time, if a message waiting signal is present, to a high-low cadence of a high voltage state and a low voltage state over time corresponding to variations in the signal;

(c) in response to each transition of a plurality of voltage transitions between the high voltage state and the low voltage state, incrementing a counter; and (d) if the counter is incremented to an appropriate number during a period of time, responding that the message waiting signal is present.

24. The device of claim 14 wherein the detection circuit further comprises:

(a) a sensing circuit which senses on the line voltage over time;

(b) a converting circuit which converts the voltage over time, if a stuttered dial tone is present, to a high-low cadence of a high voltage state and a low voltage state over time corresponding to variations in the stuttered dial tone;

(c) a counter which increments in response to each transition of a plurality of voltage transitions between the high voltage state and the low voltage state; and (d) a comparator which compares the counter value accumulated during a period of time to a stored number and, if the number is exceeded, responds that the stuttered dial tone is present.

25. The device of claim 20 wherein the off hook impedance makes the connection for approximately 1.75 seconds.

26. The method of claim 21 wherein the step of connecting the pair of conductors with an off hook impedance is performed for approximately 1.75 seconds.

27. The device of claim 22 wherein the means for establishing communications on the line establishes such communications for approximately 1.75 seconds.

28. The method of claim 23 wherein the step of establishing communication on the line establishes such communication for approximately 1.75 seconds.

29. The device of claim 24 wherein the hookswitch circuit makes a connection with the off hook impedance for approximately 1.75 seconds.

* * * * *